United States Patent [19]

Burlage et al.

[11] Patent Number: 4,559,832
[45] Date of Patent: Dec. 24, 1985

[54] PIEZOELECTRIC PRESSURE FREQUENCY SENSOR

[75] Inventors: Brian J. Burlage; David E. Wiklund; Gary A. Lenz, all of Marshalltown, Iowa

[73] Assignee: Fisher Controls Company, Inc., Marshalltown, Iowa

[21] Appl. No.: 534,979

[22] Filed: Sep. 23, 1983

Related U.S. Application Data

[63] Continuation-in-part of Ser. No. 311,542, Oct. 15, 1981, abandoned.

[51] Int. Cl.⁴ .......................... G01F 1/32; G01L 7/08; G01L 9/08
[52] U.S. Cl. .................. 73/861.24; 73/723; 73/754; 73/DIG. 4; 310/338
[58] Field of Search ................. 73/715, 717, 723, 754, 73/861.22, 861.24, DIG. 4; 310/338

[56] References Cited

U.S. PATENT DOCUMENTS

| | | | |
|---|---|---|---|
| 2,164,638 | 7/1939 | Broeze et al. | 73/DIG. 4 |
| 2,315,756 | 4/1963 | Warner | 73/DIG. 4 |
| 2,809,520 | 10/1957 | Richard, Jr. . | |
| 2,875,352 | 2/1959 | Orlacchio | 310/338 |
| 2,894,317 | 7/1959 | Marks . | |
| 3,086,132 | 4/1963 | Ostrow . | |
| 3,116,639 | 1/1964 | Bird . | |
| 3,146,360 | 8/1964 | Marshall . | |
| 3,218,852 | 11/1965 | Scarpa et al. . | |
| 3,349,259 | 10/1967 | Kistler . | |
| 3,424,930 | 1/1969 | List et al. | 310/338 |
| 3,801,838 | 4/1974 | Kistler . | |
| 3,960,018 | 6/1976 | Change . | |
| 3,972,232 | 8/1976 | Miller et al. | 73/861.24 |
| 4,085,614 | 4/1978 | Curran et al. . | |
| 4,165,654 | 8/1979 | Hammitt et al. | 73/723 |
| 4,248,098 | 2/1981 | Sawayama et al. . | |
| 4,258,565 | 3/1981 | Sawayama et al. . | |

FOREIGN PATENT DOCUMENTS 52-64477 12/1978 Japan .
2022261A 12/1979 United Kingdom .

OTHER PUBLICATIONS

Publication of Vernitron Piezoelectric Division.

Primary Examiner—Herbert Goldstein
Attorney, Agent, or Firm—Allegretti, Newitt, Witcoff & McAndrews, Ltd.

[57] ABSTRACT

A piezoelectric fluid pressure fluctuation frequency sensor, preferably for a vortex-shedding flowmeter. A piezoelectric transducer is located in a sensor chamber between and in physical contact with a diaphragm and a chamber surface. Pressure fluctuations in a von Karman vortex street outside the diaphragm compress the transducer, between the diaphragm and the chamber surface. The transducer generates a responsive electrical signal which is representative of the pressure fluctuations.

25 Claims, 12 Drawing Figures

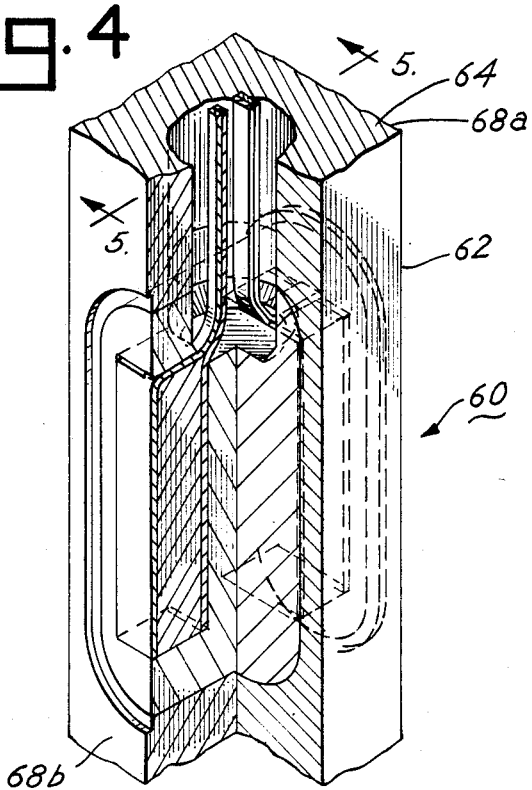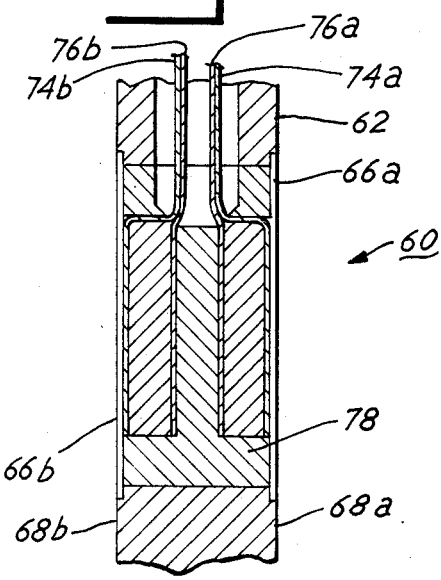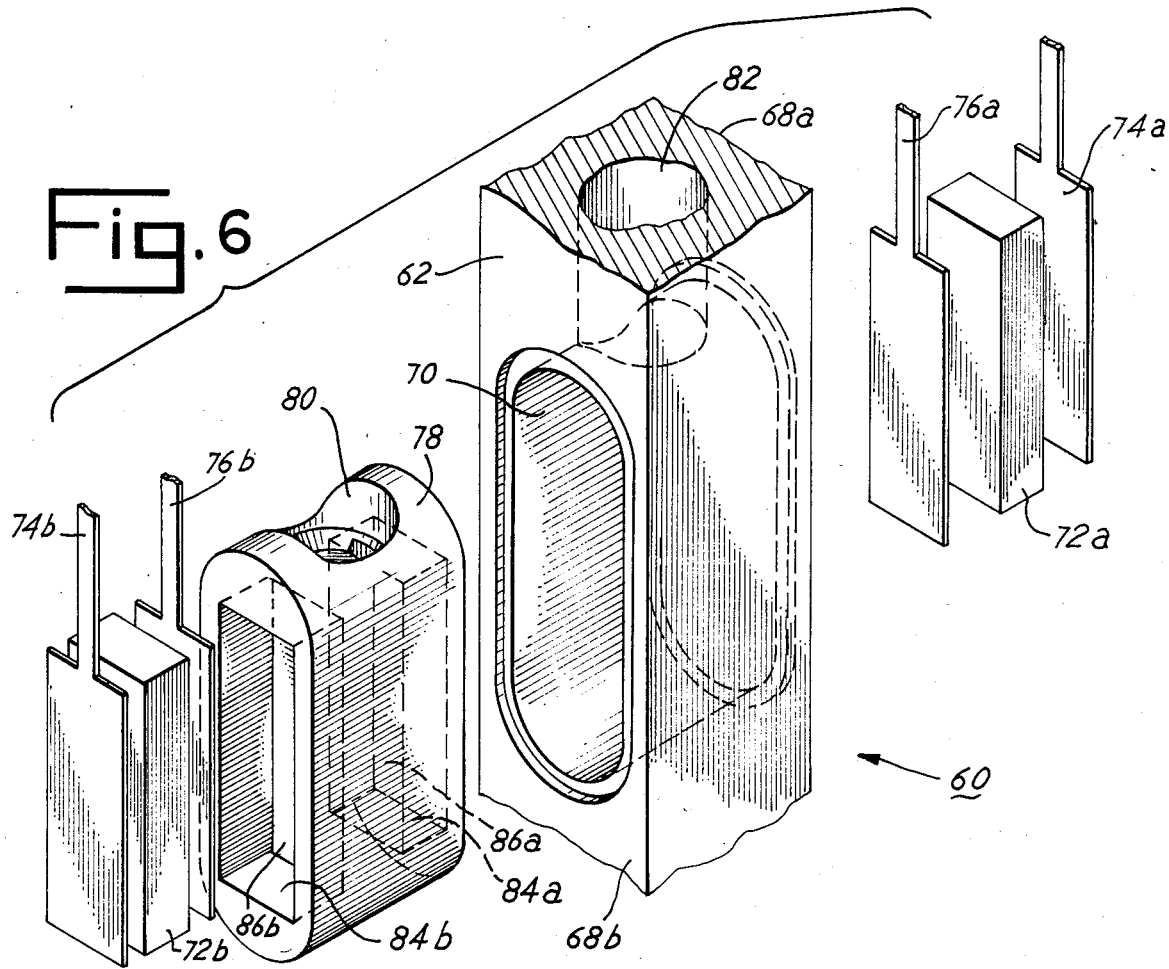

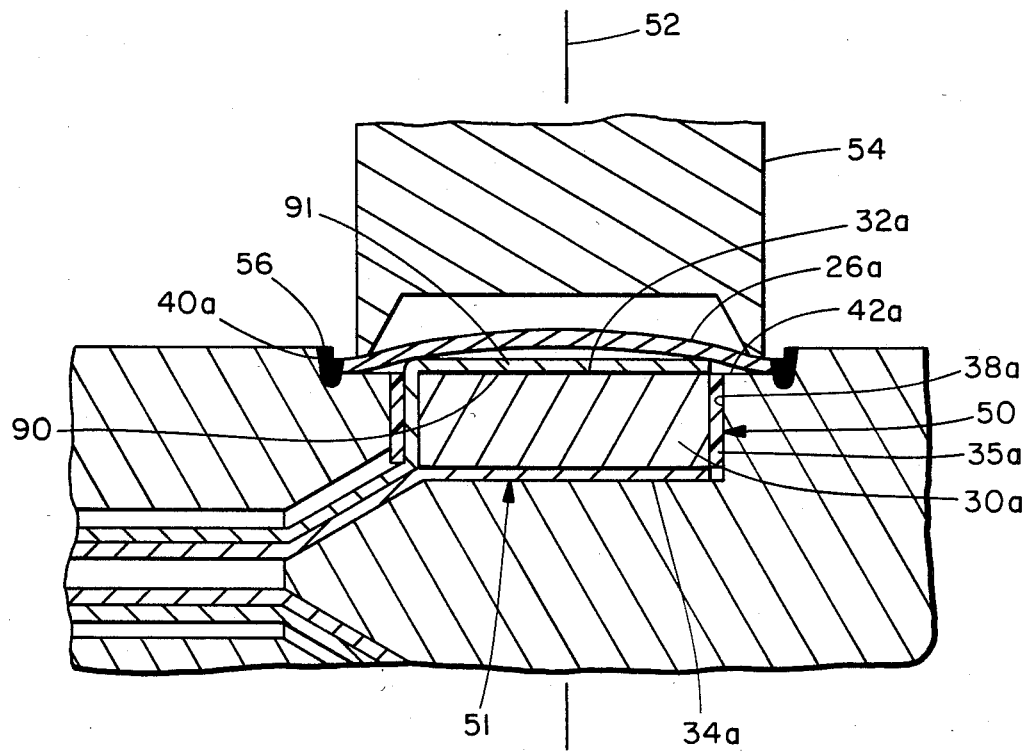
FIG.10
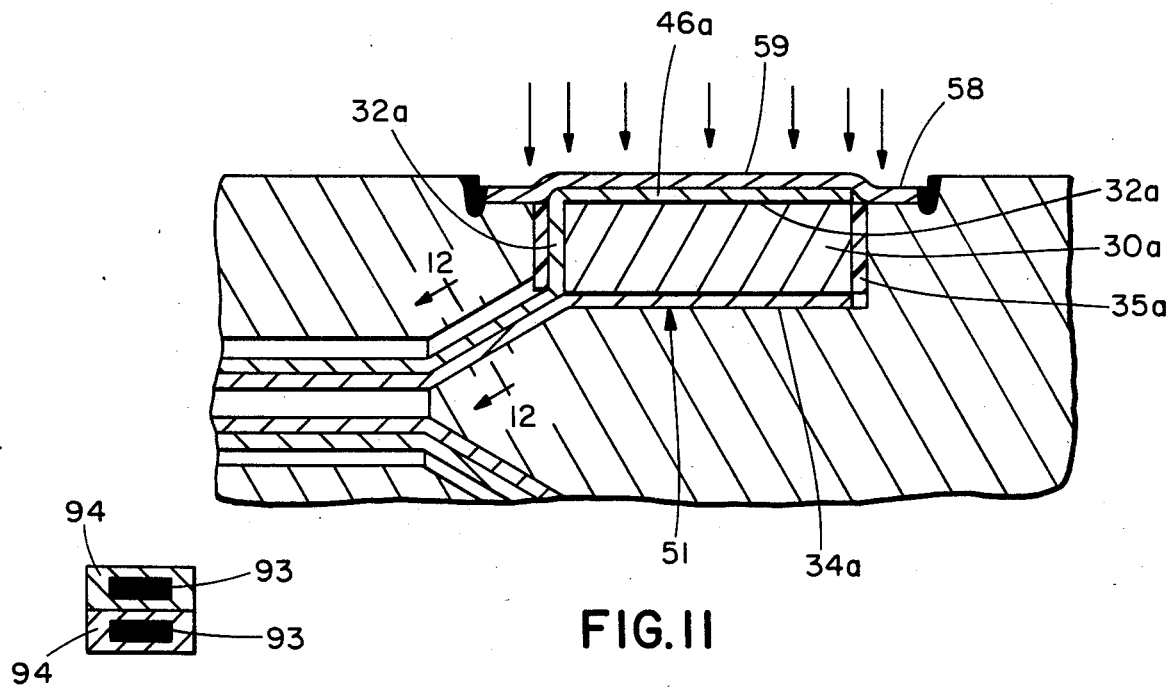
FIG.11
FIG.12

PIEZOELECTRIC PRESSURE FREQUENCY SENSOR

This is a continuation-in-part application of U.S. patent application Ser. No. 311,542 filed Oct. 15, 1981, now abandoned.

BACKGROUND OF THE INVENTION

This invention relates to a sensor for sensing the frequency of fluid pressure fluctuations, and more particularly, to a piezoelectric sensor for a vortex-shedding flowmeter.

Certain bluff bodies, when placed in fluid flow paths, shed vortices in a stable vortex formation known as a von Karman vortex street. With preferred bodies, such as in U.S. Pat. No. 4,350,047 issued on Sept. 21, 1982, the spacing of the vortices of the von Karman vortex street is sufficiently constant over desirable ranges of fluid velocities that vortex frequency can be considered proportional to fluid velocity. Vortex frequency can be measured by sensing the frequency of fluid pressure fluctuation at a fixed point in the street, since the pressure at the fixed point fluctuates according to the presence or absence of a vortex at the point.

Piezoelectric material is a desirable material as a pressure sensor. The material operates without external power supply, and responds well to applied pressure fluctuation, with an electrical signal which can be amplified for electronic processing. As a result, piezoelectric material would seem a good choice for the sensing of fluid pressure fluctuation frequency in a von Karman vortex street. Recognition of this desirability was evidenced long ago in U.S. Pat. Nos. 2,809,520; 3,116,639 and 3,218,852.

One particular vortex-shedding flowmeter pressure sensor that is known to have been offered commercially does employ piezoelectric material. However, that sensor utilizes a number of parts and requires the filling of a chamber with oil. As a result, assembly may be complex. Moreover, the piezoelectric disc employed in that sensor operates in a flexure mode, i.e., the center of the disc moves relative to the disc edges such that the disc is flexed into varying degrees of curvature. It is believed that this mode of operation requires relatively wide deflection of the piezoelectric disc for signal generation and would also entail wide deflection of the diaphragms of the sensor, such that diaphragm fatigue and rupture are a possible concern. Thus, that particular piezoelectric sensor is not wholly advantageous. Simplicity and ruggedness remain in the art as unachieved objectives.

In sum, piezoelectric materials have been long known to be desirable for vortex-shedding flow meter sensors, but the art to date has failed to discover a simplified, rugged piezoelectric sensor suitable for commercial offering as a fluid pressure fluctuation frequency sensor. As a result, many commercial offerings of such sensors continue to be of the hot wire and other non-piezoelectric types.

SUMMARY OF THE INVENTION

An object of this invention is to provide a piezoelectric pressure sensor which is suitable for sensing the frequency of fluid pressure fluctuations in a dynamic fluid pressure.

Another object of this invention is to provide such a piezoelectric sensor which is suitable for a vortex-shedding flowmeter.

Another object of the invention is to provide a piezoelectric sensor suitable for a vortex-shedding flowmeter which is also ingeniously simple.

A fourth object of the invention is to provide an ingeniously simple piezoelectric sensor for a vortex-shedding flowmeter, which includes a diaphragm which is able to withstand the high frequency pressure fluctuations of a von Karman vortex street (e.g., 10–120 Hz for liquid, 100–1200 Hz for gas in a 50 mm conduit), without damage from fatigue or rupture, throughout an extended useful life.

These and other objects and advantages are satisfied by the invention, which, in a principal aspect, in a sensor adapted to sense a frequency of pressure fluctuations in a dynamic fluid comprising a sensor body, a transducer assembly and a diaphragm. The sensor body has a sensor chamber including an exterior chamber opening and an interior chamber surface spaced opposite the opening. The transducer assembly includes a piezoelectric transducer located in the sensor chamber and seated against the interior chamber surface. The transducer assembly has an end extending from the sensor chamber through and beyond the chamber opening. The diaphragm is mounted on the sensor body and seals the chamber opening. The diaphragm is preloaded against the transducer assembly, to hold the transducer assembly against the interior chamber surface in preloaded compression while the diaphragm is held in preloaded tension by the transducer assembly. The diaphragm is formed to conform to the end of the transducer assembly such that pressure fluctuations outside the chamber against the diaphragm cause compression fluctuations in the piezoelectric transducer. The fluctuations cause the transducer to responsively generate an electrical signal representative of the frequency of the pressure fluctuations.

In this aspect, the invention is a fluid pressure fluctuation frequency sensor operating in a compression mode, involving relatively no deflection of the diaphragm. Pressure on the diaphragm is directly transmitted to the transducer substantially without deflection of the diaphragm. As a result of the structure, mode of operation and the physical contact, relatively no changing stress, fatigue or rupture of the diaphragm occurs, as compared with other, prior art, piezoelectric sensors.

Further, the physical contact of the diaphragm and transducer and a preferred dry mounting involve a simplicity which is ingenious, especially as compared to the mentioned commercially-offered sensor. Components such as the oil fill, oil ports, spacer rings and clamp rings are absent from the inventive sensor, resulting in ease of manufacture and economy.

These and other objects, aspects and advantages of the invention are further detailed in the description which follows.

BRIEF DESCRIPTION OF THE DRAWINGS

The preferred embodiments of the invention are described in relation to the accompanying drawing. The drawing consists of twelve figures, wherein:

FIG. 4 is a cut-away, perspective view of a second preferred embodiment of the invention;

FIG. 5 is a broken cross-section view of the second preferred embodiment, taken along line 5—5 in FIG. 4;

FIG. 6 is an exploded, perspective view of the second preferred embodiment;

FIG. 10 is a broken, cross-section view of the flowmeter of FIG. 1, similar to FIG. 2, during a step of assembly;

FIG. 11 is another broken, cross-section view of the flowmeter of FIG. 1, similar to FIG. 2, during another step of assembly; and FIG. 12 is a detail, cross-section view taken along line 12—12 of FIG. 1.

DETAILED DESCRIPTION OF THE PREFERRED EMBODIMENTS

Figure 1:
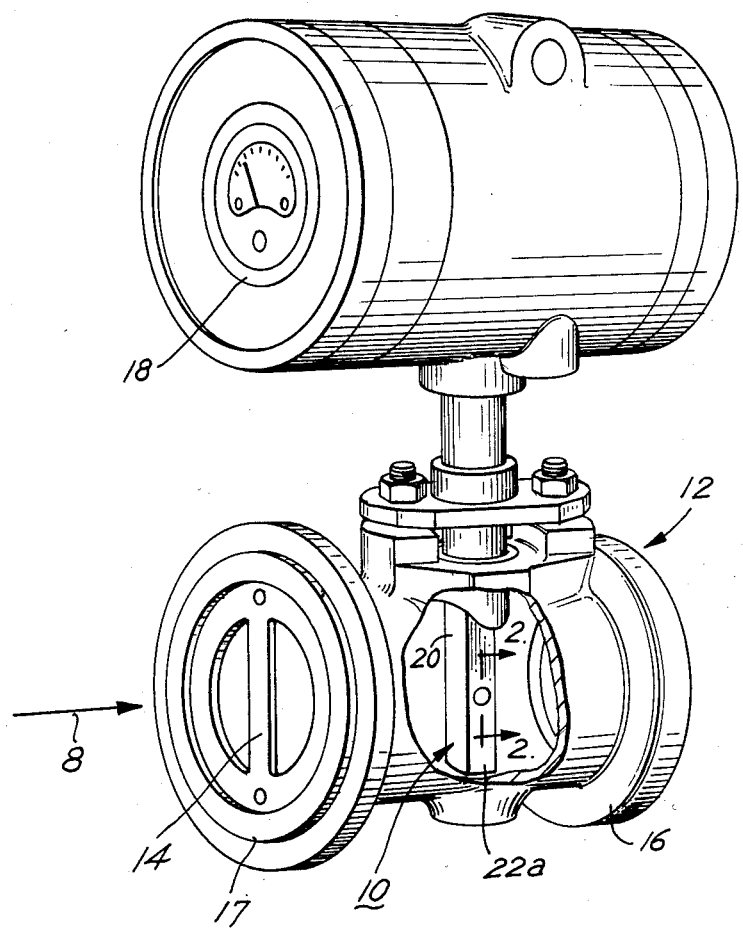
FIG. 1 is a perspective view of a vortex-shedding flowmeter, cut away to reveal the location of the first preferred embodiments of the invention.
Figure 2:
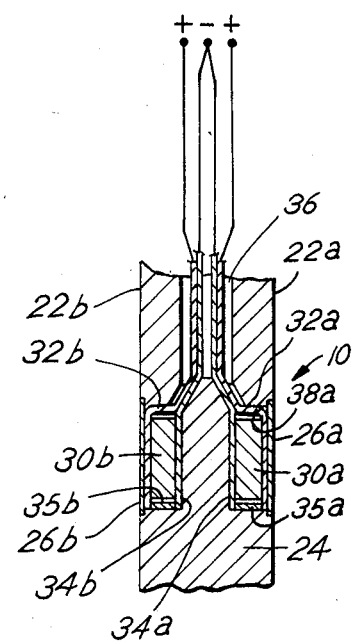
FIG. 2 is a broken, cross-section and schematic view of the first preferred embodiment, taken along line 2—2 in FIG. 1.
Figure 3:
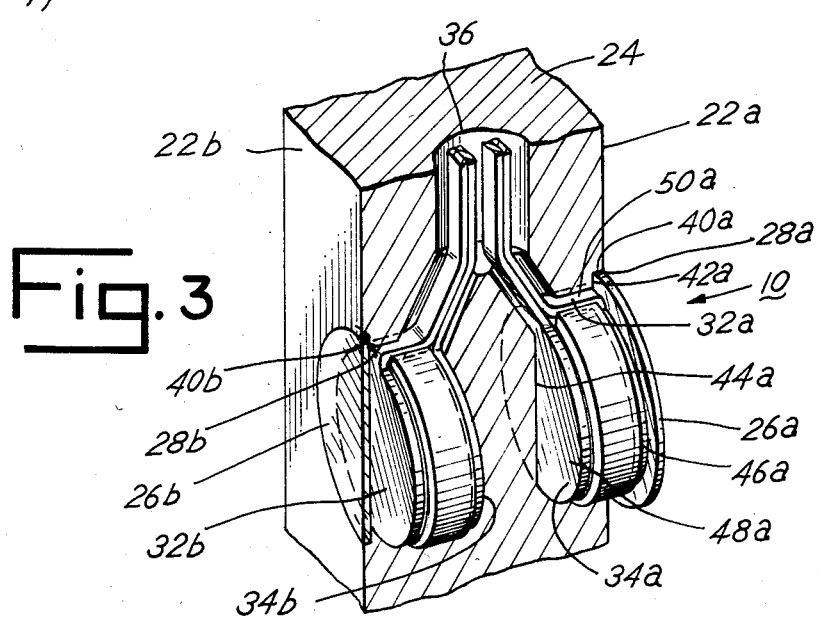
FIG. 3 is a perspective view of the first preferred embodiment, with some elements cross-sectioned as in FIG. 2 and others shown in full, for clarity.

Referring to the accompanying drawing, the first preferred embodiment of the invention is a fluid pressure fluctuation frequency sensor generally designated 10. Referring to FIGS. 1-3, the sensor 10 is located within and as part of a vortex-shedding flowmeter generally designated 12. The purpose of the meter 12 is to measure the velocity of a fluid flowing within a pipe (not shown). The meter 12 includes pipe sections 16 and 17 to be fitted to the pipe, and velocity reporting or recording instruments such as electronic signal conditioning and enhancing circuitry associated with a gauge 18.

The meter 12 operates by creating a von Karman vortex street in the pipe section 16, and measuring the frequency of fluid pressure fluctuations at a fixed point in the street. In the embodiment illustrated, a bluff body 14 is adapted to cause the street within the pipe section 16. Fluid flows past the body 14 in the direction of the arrow 8. A sensor-carrying body 20 (also a bluff body) is located downstream of the separation point of the bluff body 14, within the wake thereof, with two (one is shown in FIG. 1) side surfaces 22a, 22b parallel to and directly inside the rows of the street. The vortices of one row pass directly beside one side surface 22a; the vortices of the other row pass directly beside the other side surface 22b. Thus, the frequency of pressure fluctuations in the street can be measured at the side surfaces 22a, 22b.

The frequency is measured by the sensor 10, which is located on and within the body 20. The sensor includes the portion 24 of the body 20 adjacent the vortex rows, and two diaphragms 26a, 26b. One diaphragm 26a is located on the one side surface 22a, and other diaphragm 26b is located on the other side surface 22b.

The sensor further includes two sensor chambers 28a, 28b; two piezoelectric discs 30a, 30b; two pairs 32a, 34a and 32b, 34b of electrical leads; and two electrical insulators 35a, 35b. The sensor chambers 28a, 28b extend generally perpendicular to the body side surfaces 22a, 22b in an axial direction. The piezoelectric discs 30a, 30b are located within the chambers 28a, 28b and the leads 32a, 32b, 34a, 34b extend from within the chambers through a passage 36 in the body 20 toward the gauge 18. The leads are electrically connected to the signal conditioning and enhancing circuitry.

The pairs of sensor chambers 28a, 28b; discs 30a, 30b; leads 32a, 34a, 32b, 34b; and insulators 35a, 35b are substantially identical to each other. The chamber 28a, disc 30a, and leads 32a, 34a are mirror images of the chamber 28b, disc 30b, and leads 32b, 34b, respectively. For clarity of drawing and description, only chamber 28a, disc 30a, leads 32a, 34a and insulator 35a are now described.

Chamber 28a is a substantially cylindrical bore defined by an inner sidewall 38a which extends axially inward from a chamber opening defined by a transversely extending ledge 42a of a counterbore in the body side surface 22a. The chamber sidewall 38a has a substantially uniform diameter, from the chamber opening at ledge 42a to a substantially circular, transversely extending inner or interior chamber surface 44a. The surface 44a meets the sidewall 38a to form the "bottom" of the chamber 28a. The surface 44a is substantially planar, substantially circular, and parallels the side surface 22a and ledge 42a.

The ledge 42a supports the periphery of the diaphragm 26a, which is a thin, circular member, across the chamber opening. The diameters of an axially extending outer sidewall portion 40a and the diaphragm 26a are sized to provide a snug fit between the diaphragm 26a and the sidewall portion 40a of the counterbore. The width of the sidewall portion 40a is sized to provide for support of the diaphragm 26a by the ledge 42a with the outer surface of the periphery of the diaphragm 26a being substantially coplanar with the body side surface 22a.

The diaphragm 26a is secured to the ledge 42a. A laser weld may, for example, seal the diaphragm 26a about its periphery to the ledge. The seal provided by the laser weld isolates the interior of the chamber 28a from the fluid in the flowmeter 12, to provide a benign environment for the disc 30a, leads 32a, 34a and insulator 35a. The laser weld is especially desirable for the seal, to eliminate disc damage from overheating during the sealing.

The disc 30a is fitted within the chamber 28a between the two leads 32a, 34a, and the insulator 35a. The disc 30a is in direct physical contact with the leads and insulator, and thereby in indirect physical contact with the diaphragm 26a, the inner chamber surface 44a and the sidewall 38a. More specifically, the disc 30a is sandwiched between a thin, planar and circular portion 46a of the lead 32a and a substantially identical portion 48a of the lead 34a. The lead portion 46a is parallel to, and abuts, the diaphragm 26a over its surface, while the lead portion 48a is parallel to, and abuts, the chamber inner surface 44a over its surface. The insulator 35a extends around the edge of the disc 30a along the chamber sidewall 38a, from one side of the narrow strip 50a of conductor 32a to the other side thereof.

The disc 30a, leads 32a, 34a, and insulator 35a are snugly dry-mounted in the chamber 28a with allowance for disc dimensional changes on the order of less than 0.1 micrometer. They are not attached to each other in the chamber 28a, or to the diaphragm 26a or body 20. No fluid or adhesive is present in the chamber 28a. Fluids, adhesive and other resilient materials are considered to be detrimental.

As shown in FIGS. 10 and 11, the disc 30a, leads 32a, 34a, insulator 35a and diaphragm 26a are assembled in the chamber 28a. The disc 30a, leads 32a, 34a and insulator 35a form a transducer assembly 51. The thickness of the assembly 51 is the sum of the thicknesses of the disc 30a, and leads 32a, 34a. All thicknesses are defined in the axial direction defined by the centerline 52 of the chamber 28a. The assembly thickness exceeds the depth of the chamber 28a between the ledge 42a and the surface 44a. As a result, the assembly 50 has an end extending through and beyond the chamber opening at ledge 42a.

During the assembly of the sensor 10, a fixture 54 holds the diaphragm 26a against the ledge 42a and the transducer assembly 51 and axially preloads the diaphragm 26a against the transducer assembly 51 which is seated against interior chamber surface 44a, as in FIG. 10. The laser weld 56 is made, while the fixture 54 holds the diaphragm 26a and the assembly 51, also as in FIG. 10. The weld 56 is formed on the ledge 42a and outer sidewall 40a away from the inner sidewall 38a.

After completion of the weld 56, the fixture 54 is removed and the diaphragm 26a is hydroformed under a pressure of approximately 2,000 psi, or approximately 13,790 kilopascals (kPa), to conform around and to the surface of the protruding end of the assembly 51, as in FIG. 11. Within the periphery 58, a central, exposed fluid pressure receiving surface portion 59 is defined in the diaphragm 26a. The surface portion 59 is raised from the periphery 58. The surface portion 59 is in direct physical contact with the circular portion 46a of the electrical lead 32a over its whole area. As stated above, the circular lead portion 46a is in direct physical contact with the disc 30a over its whole area. Because of the relationship of the thickness of the transducer assembly 51 to the inner chamber wall depth, the diaphragm 26a remains preloaded in both radial and axial tension, while the disc 30a remains preloaded in compression.

The disc 30a is a piezoelectric transducer, and more specifically, a cylindrical disc of ceramic or crystalline material having piezoelectric properties. One such disc is made by the Vernitron Corporation of Bedford, Ohio. Compression across the opposite, planar surfaces of the disc causes the disc to generate positive and negative charges at the opposite surfaces. These charges are related to the amount of compression across the disc.

The generated charges are carried by the leads 32a, 34a to the gauge 18. Electrical contact with the charged surfaces of the disc 30a is provided by the circular portions 46a, 48a of the leads. The leads are formed by copper deposit on a polyimide film, etching to remove undesired deposit, application of a second film, and stamping to separate completed leads. As in FIGS. 10 and 11, the copper deposits of the circular portions 46a, 48a of the leads 32a, 34a, such as deposit 90, are exposed to the disc 30a. The deposits are insulated from the sensor body and diaphragm by the polyimide film thereof, such as film 91. As in FIG. 12, in the remainder of the leads, the copper deposits 93 are sealed within the films 94.

The insulator 35a is also formed of an insulation (e.g., polyimide) coated copper or other stiff and springy material. The polyimide film completely envelopes the copper. The insulator is initially formed as a flat strip, with the copper providing the support and flexibility required for shaping of the insulator 35a.

The disc 30a is thus held within the chamber 28a, between the diaphragm 26a and chamber surface 44a. The rigidities of the chamber surface 44a, disc 30a and diaphragm 26a are related such that pressure fluctuations applied against the diaphragm 26a cause compression fluctuations in the disc 30a, but do not vibrate the diaphragm 26a. The diaphragm is essentially or substantially static, flexing only to the extent of compression in the transducer assembly 51. As a result of this minimal flexing, the diaphragm is substantially free of fatigue, while the disc 30a responds sufficiently to pressure fluctuations to function as a sensor of the frequency of fluid pressure fluctuations.

Since the disc 30a responds to compression fluctuations with an electrical signal related to the compression fluctuations of the disc, and since the compression fluctuations are representative of the pressure fluctuations, the signal of the disc 30a is representative of the pressure fluctuations. Thus, the frequency of pressure fluctuations adjacent the one body side surface 22a can be determined from the frequency of the signal of the disc 30a.

It should be understood that each disc 30a, 30b generates an electrical signal. The signals have the same frequency, since the vortex rows have the same frequency. As a result, the signals may be electronically processed together or separately, as desired, to record or report the frequency of fluid pressure fluctuations in the street, and thereby the velocity of the fluid. One desired processing alternative is the subtraction of signals from the sensor pair to achieve a high signal-to-noise ratio.

Referring now to FIGS. 4-6, the second preferred embodiment is a fluid pressure fluctuation frequency sensor generally designated 60. The sensor 60 includes a portion 64 of a body 62, and two diaphragms 66a, 66b (not shown in FIGS. 4 and 6, for clarity). One diaphragm 66a is located on one side surface 68a of the body 64, and the other diaphragm 66b is located on the opposite side surface 68b of the body 64.

The sensor 60 further includes a sensor chamber 70; two piezoelectric plates 72a, 72b; two pairs 74a, 76a and 74b, 76b of electrical leads; and an electrical insulator body 78. The sensor chamber 70 extends generally perpendicular to the body side surfaces 68a, 68b through the body portion 64. In planes parallel to the body side surfaces 68a, 68b, the sensor chamber 70 is oblate in shape, as are the diaphragms 66a, 66b.

The insulator 78 occupies the chamber 70. The insulator 78 is externally shaped to match the chamber 70. A passage 80 in the insulator 78 is aligned with a passage 82 in the body portion 64, and opens into two plate chambers 84a, 84b in the insulator 78. The piezoelectric plates 72a, 72b and the leads 74a, 76a, 74b, 76b are located within the chambers 84a, 84b, respectively. The leads extend from within the chambers 84a, 84b through the passages 80, 82.

In further detail, the sensor 60 is similar to the sensor 10. For example, the plates 72a, 72b are sandwiched between their respective leads 74a, 76a, 74b, 76b in indirect physical contact with the respective diaphragms 66a, 66b and inner chamber surfaces 86a, 86b.

Figure 7:
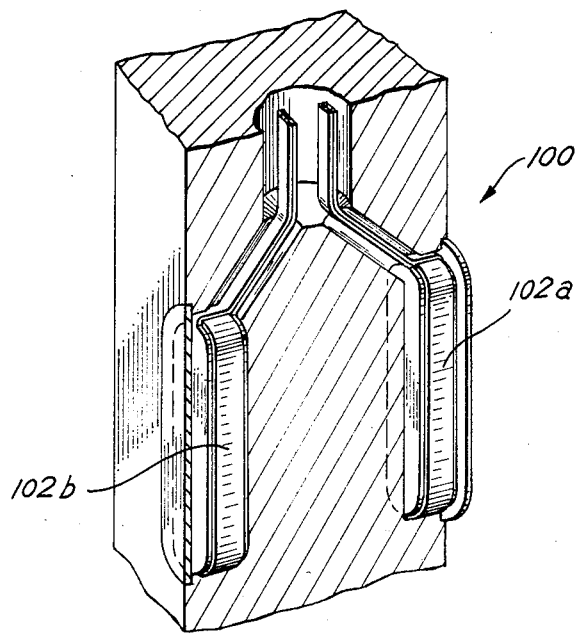
FIG. 7 is a perspective view similar to FIG. 3 of a third preferred embodiment of the invention.

Referring to FIG. 7, the third preferred embodiment is a sensor 100. The sensor 100 is substantially identical to the sensor 10. The exception is that the piezoelectric elements 102a, 102b are oblate and the sensor chambers, leads and diaphragms are shaped to match. Physical interrelationships are retained, and function is enhanced, as with sensor 60, by the increased dimension of the piezoelectric elements in a direction transverse to the street.

Figure 9:
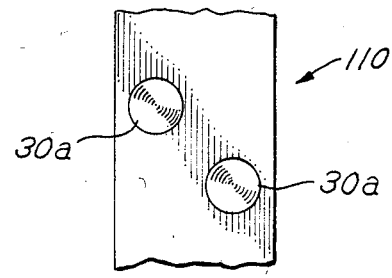
FIG. 9 is a broken, side elevation view of the fourth preferred embodiment.
Figure 8:
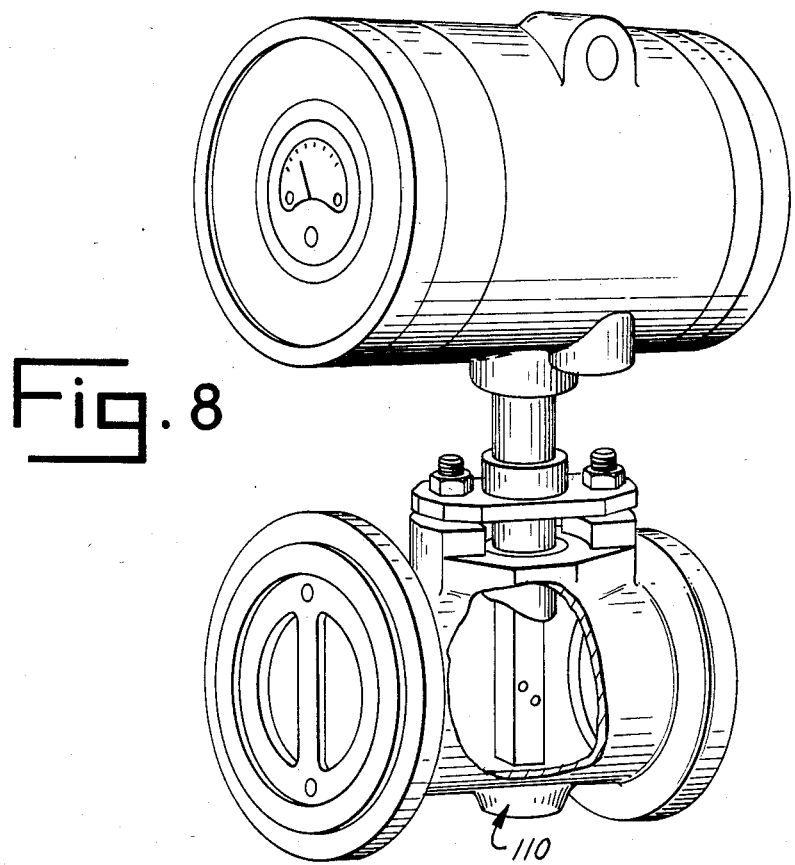
FIG. 8 is a perspective view similar to FIG. 1 of the flow meter cut away to reveal a fourth preferred embodiment of the invention.

Referring to FIGS. 8 and 9, the fourth preferred embodiment is a sensor 110 having the enhanced function of the sensors 60, 100 achieved by pairing piezoelectric discs 30a, 30b and the associated structure of the sensor 10 with two further, spaced discs 30a, 30b and structure (30b discs not shown), for a total of four discs. In structure, the sensor 10 is equivalent to two sensors 10, with the leads of the 30a discs connected and the leads of the 30b discs connected.

The preferred embodiments of the invention have now been described in detail, with the non-sensor aspects of the illustrated flowmeter only generally described, for clarity. Further information about the vortex-shedding flowmeter as generally described can be obtained from U.S. Pat. No. 4,350,047 issued Sept. 21, 1982 to C Forbes Dewey, Jr. and David E. Wiklund, and incorporated herein by reference. However, it should be understood that while the invention is described in the context of a specific type of vortex-shedding flowmeter for which it is especially adapted, the invention is not restricted to such an application. Vortex-shedding flowmeters of various types may include the invention, as may non-vortex-shedding flowmeters. For example, a vortex-shedding flowmeter with a single bluff body may include the invention. As another example, a vortex-shedding flowmeter may include the invention positioned on a wall of the meter. Moreover, the invention may be applied to diverse flow measurement apparatus, such as may be used in ducts, open channels and wherever the sensing of the frequency of dyanamic fluid pressure fluctuations is desired.

Thus, while preferred embodiments of the present invention have been described and illustrated in specific applications, the invention should not be limited thereto, but may be otherwise embodied within the scope of the following claims.

What is claimed is:

1. A sensor adapted to sense a frequency of pressure fluctuations in a dynamic fluid, the sensor comprising:
   a sensor body having a sensor chamber including an exterior chamber opening and a solid interior chamber surface spaced opposite the opening;
   a transducer assembly including a piezoelectric transducer located in the sensor chamber, seated against the solid interior chamber surface, and having an end extending from the sensor chamber through and beyond the chamber opening; and
   a diaphragm mounted on the sensor body and sealing the chamber opening, the diaphragm being preloaded against the transducer assembly to hold the transducer assembly against the interior chamber surface in preloaded compression while the diaphragm is held in preloaded tension by the transducer assembly, and the diaphragm being formed to conform to the contour of the end of the transducer assembly and to conform to the contour of the sensor body adjacent the transducer assembly such that the diaphragm is in physical contact with the transducer assembly and the sensor body substantially completely throughout the extent of the diaphragm and such that pressure fluctuations outside the chamber against the diaphragm cause compression fluctuations in the piezoelectric transducer which cause the piezoelectric transducer to responsively generate an electrical signal representative of the frequency of the pressure fluctions.

2. A fluid pressure fluctuation frequency sensor as in claim 1, in which the diaphragm is non-vibratory to lessen fatigue.

3. A fluid pressure fluctuation frequency sensor as in claim 1, in which the diaphragm is adapted to flex only to the extent of compression in the transducer assembly, to lessen fatigue.

4. A fluid pressure fluctuation frequency sensor as in claim 1, in which the diaphragm is substantially static, to lessen fatigue.

5. A fluid pressure fluctuation frequency sensor as in claim 1, in which the transducer assembly is dry mounted in the sensor chamber.

6. A fluid pressure fluctuation frequency sensor as in claim 1, which is the product of a process of forming the diaphragm to conform to the end of the transducer assembly while the diaphragm is held in preloaded tension by the transducer assembly.

7. A fluid pressure fluctuation frequency sensor as in claim 6, in which the diaphragm is welded to the sensor body and then formed to conform to the end of the transducer assembly.

8. A fluid pressure fluctuation frequency sensor as in claim 1, in which the diaphragm is hydroformed to conform to the end of the transducer assembly.

9. A fluid pressure fluctuation frequency sensor as in claim 1 in which the transducer assembly includes a pair of electrical leads to the piezoelectric transducer, one of the electrical leads being positioned between the diaphragm and the piezoelectric transducer in direct physical contact with the diaphragm and the piezoelectric transducer, and the other of the electrical leads being positioned between the piezoelectric transducer and the interior chamber surface in direct physical contact with the piezoelectric transducer and the interior chamber surface.

10. A fluid pressure fluctuation frequency sensor as in claim 1, in which the sensor chamber is substantially cylindrical, the chamber opening, the interior chamber surface and the diaphragm are substantially circular, and the transducer assembly is substantially cylindrical.

11. A fluid pressure fluctuation frequency sensor as in claim 1, in which the sensor chamber is substantially oblate, the chamber opening, the interior chamber surface and the diaphragm are substantially oblate, and the transducer assembly is substantially oblate.

12. A sensor adapted to sense a frequency of pressure fluctuations in a dynamic fluid, the sensor comprising:
   a sensor body defining a sensor chamber with a central axis defining an axial direction along the central axis, and a transverse direction perpendicular to the central axis and further defining a transversely extending exterior chamber opening and a transversely extending, solid interior chamber surface spaced opposite the exterior chamber opening along the transverse direction;
   a diaphragm mounted on the body and sealing the exterior chamber opening; and
   a piezoelectric transducer assembly of at least a piezoelectric transducer having a contour surface, the piezoelectric transducer being located in the sensor chamber between the diaphragm and the solid interior chamber surface, the piezoelectric transducer being in at least indirect, rigid physical contact with the diaphragm and the interior chamber surface, the diaphragm and piezoelectric transducer being preloaded in the axial direction with the diaphragm being preloaded to hold the piezoelectric transducer assembly against the interior chamber surface in preloaded compression in the axial direction while the diaphragm is held in preloaded tension by the transducer assembly, and the diaphragm being formed to the contour of the piezoelectric transducer assembly and to conform to the contour of the sensor body adjacent the transducer assembly such that the diaphragm as in physical contact with the transducer assembly and the sensor body substantially completely throughout the extent of the diaphragm and such that, with the relative rigidities of the interior chamber surface, piezoelectric transducer and diaphragm being such that pressure fluctuations outside the sensor chamber against the diaphragm cause compression fluctuations in the piezoelectric transducer, and with the piezoelectric transducer oriented such that compression fluctuations of the piezoelectric transducer between the diaphragm and interior chamber surface cause the piezoelectric transducer to responsively generate an electrical signal related to the compression fluctuations, and thereby the pressure fluctuations.

13. A fluid pressure fluctuation frequency sensor as in claim 12 in which the diaphragm has a central, exposed, fluid pressure receiving surface portion, the surface portion being raised in relation to the exterior chamber opening, in the axial direction away from the interior chamber surface.

14. A fluid pressure fluctuation frequency sensor as in claim 12 in which the sensor chamber has a chamber depth in the axial direction, in which the piezoelectric transducer assembly has an assembly thickness in the axial direction, and in which the assembly thickness exceeds the chamber depth.

15. A fluid pressure fluctuation frequency sensor as in claim 12 in which the piezoelectric transducer assembly is dry mounted in the sensor chamber.

16. A fluid pressure fluctuation frequency sensor as in claim 12 in which the piezoelectric transducer assembly includes a pair of electrical leads to the piezoelectric transducer, one of the electrical leads being positioned between the diaphragm and the piezoelectric transducer in direct physical contact with the diaphragm and the piezoelectric transducer, and the other of the electrical leads being positioned between the piezoelectric transducer and the interior chamber surface in direct physical contact with the piezoelectric transducer and interior chamber surface.

17. A fluid pressure fluctuation frequency sensor as in claim 16 in which the sensor chamber has a depth in the axial direction, in which the piezoelectric transducer has a transducer thickness in the axial direction, in which the electrical leads have an electrical lead thickness in the axial direction, and in which the sum of the transducer thickness and the electrical lead thickness exceeds the depth of the sensor chamber.

18. A fluid pressure fluctuation frequency sensor as in claim 16 in which the piezoelectric transducer and electrical leads are dry mounted in the sensor chamber.

19. A dynamic fluid pressure sensor as in claim 12 in which the sensor body defines a chamber wall between the exterior chamber opening and interior chamber surface, and the piezoelectric transducer has an edge, the piezoelectric transducer assembly including means for electrically insulating the piezoelectric transducer along the edge, the insulating means being mounted along the edge against the chamber wall.

20. A dynamic fluid pressure sensor as in claim 12 in which the sensor chamber is substantially cylindrical, the exterior chamber opening, interior chamber surface and diaphragm are substantially circular, and the piezoelectric transducer is a substantially cylindrical disc.

21. A dynamic fluid pressure sensor as in claim 12 in which the sensor chamber is substantially oblate, the exterior chamber opening, interior chamber surface and diaphragm are substantially oblate, and the piezoelectric transducer is a substantially oblate element.

22. In a vortex-shedding flowmeter having a bluff body generating a von Karman vortex street of two rows of vortices in a flow of fluid, and a sensor carrying body, the improvement comprising:
a portion of the sensor-carrying body having at least a first side surface and defining a sensor chamber extending in a generally perpendicular direction to the side surface from the side surface into the portion, with an exterior chamber opening adjacent the side surface and an interior chamber surface opposite the exterior chamber opening, the generally perpendicular direction being an axial direction;
a diaphragm mounted on the body to the side surface and sealing the exterior chamber opening; and
a piezoelectric transducer assembly of at least a piezoelectric transducer, the piezoelectric transducer being located in the sensor chamber between the diaphragm and the interior chamber surface, the piezoelectric transducer being in at least indirect, rigid physical contact with the diaphragm and the interior chamber surface, the diaphragm and piezoelectric transducer being preloaded in the axial direction with the diaphragm being preloaded to hold the piezoelectric transducer assembly against the interior chamber surface in preloaded compression in the axial direction while the diaphragm is held in preloaded tension by the transducer assembly, and the diaphragm being formed to the contour of the piezoelectric transducer assembly, with the relative rigidities of the interior chamber surface, the piezoelectric transducer, and the diaphragm being such that pressure fluctuations in one of the rows of vortices outside the chamber against the diaphragm cause compression fluctuations in the piezoelectric transducer, and with the piezoelectric transducer oriented such that compression fluctuations of the interior chamber surface cause the piezoelectric transducer to generate a first electrical signal related to the compression fluctuations, and thereby the pressure fluctuations, in the one row of vortices.

23. The improvement in a flowmeter as in claim 22 in which the sensor chamber is a first sensor chamber, the diaphragm is a first diaphragm and the piezoelectric transducer is a first piezoelectric transducer, the improvement further comprising:
the portion of the sensor-carrying body having a second side surface opposite the first side surface and defining a second sensor chamber extending in the generally perpendicular direction to the second side surface from the second side surface into the portion, with a second exterior chamber opening adjacent the second side surface and a second interior chamber surface opposite the second exterior chamber opening;

a second diaphragm mounted on the body to the second side surface and sealing the second exterior chamber opening;

the second piezoelectric transducer being located in the second sensor chamber between the second diaphragm and the second interior chamber surface, the second piezoelectric transducer being in at least indirect, rigid physical contact with the second diaphragm and the second interior chamber surface, the second diaphragm and second piezoelectric transducer being preloaded in the axial direction with the second diaphragm being preloaded to hold the second piezoelectric transducer assembly against the second interior surface in preloaded compression in the axial direction while the second diaphragm is held in preloaded tension by the second transducer assembly, and the second diaphragm being formed to the contour of the second piezoelectric transducer assembly with the relative rigidities of the second interior chamber surface, the second piezoelectric transducer and the second diaphragm being such that second pressure fluctuations in the second of the rows of vortices outside the second chamber against the second diaphragm cause second compression fluctuations in the second piezoelectric transducer, and with the second piezoelectric transducer oriented such that the second compression fluctuations of the second piezoelectric transducer between the second diaphragm and the second interior chamber surface cause the second piezoelectric transducer to generate a second electrical signal related to the second compression fluctuations, and thereby the second pressure fluctuations, in the second row of vortices; and means for combining the first electrical signal and the second electrical signal.

24. In a vortex-shedding flowmeter having a bluff body generating a von Karman vortex street of two rows of vortices in a flow of fluid, and a sensor carrying body, the improvement comprising:

a portion of the sensor-carrying body having at least a first side surface and having a sensor chamber in the first side surface including an exterior chamber opening and an interior chamber surface spaced opposite the opening;

a piezoelectric transducer assembly including a piezoelectric transducer located in the sensor chamber, seated against the interior chamber surface, and having an end extending from the sensor chamber through and beyond the exterior chamber opening; and a diaphragm mounted on the sensor body to the first side surface and sealing the exterior chamber opening, the diaphragm being preloaded against the piezoelectric transducer assembly to hold the piezoelectric transducer assembly against the interior chamber surface in preloaded compression while the diaphragm is held in preloaded tension by the piezoelectric transducer assembly, and the diaphragm being formed to conform to the end of the piezoelectric transducer assembly such that pressure fluctuations in one of the rows of vortices outside the chamber against the diaphragm cause compression fluctuations in the piezoelectric transducer which cause the piezoelectric transducer to responsively generate a first electrical signal representative of the frequency of the pressure fluctuations in the one row of vortices.

25. The improvement in a flowmeter as in claim 24 in which the sensor chamber is a first sensor chamber, the diaphragm is a first diaphragm and the transducer assembly is a first transducer assembly, the improvement further comprising:

the portion of the sensor-carrying body having a second side surface opposite the first side surface and having a second sensor chamber in the second side surface including a second exterior chamber opening and a second interior chamber surface spaced opposite the second chamber opening;

a second piezoelectric transducer assembly including a second piezoelectric transducer located in the second sensor chamber, seated against the second interior chamber surface, and having an end extending from the second sensor chamber through and beyond the second exterior chamber opening; and a second diaphragm mounted on the sensor body to the second side surface and sealing the second exterior chamber opening, the second diaphragm being preloaded against the second piezoelectric transducer assembly to hold the second piezoelectric transducer assembly against the second interior chamber surface in preloaded compression while the second diaphragm is held in preloaded tension by the piezoelectric transducer assembly, and the second diaphragm being formed to conform to the end of the second piezoelectric transducer assembly such that second pressure fluctuations in the second of the rows of vortices outside the second chamber against the second diaphragm cause second compression fluctuations in the second piezoelectric transducer, which cause the second piezoelectric transducer to responsively generate a second electrical signal representative of the frequency of the second pressure fluctuations in the second row of vortices; and means for combining the first electrical signal and the second electrical signal.

* * * * *